(12) United States Patent
Aksu (10) Patent No.: US 8,913,524 B1
(45) Date of Patent: Dec. 16, 2014

(54) SELECTING A PARTICULAR CODEC LIST FOR CODEC NEGOTIATION

(71) Applicant: Verizon Patent and Licensing Inc., Basking Ridge, NJ (US)

(72) Inventor: Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/911,666

(22) Filed: Jun. 6, 2013

(51) Int. Cl.
*H04L 12/28* (2006.01)
*H04L 29/06* (2006.01)

(52) U.S. Cl.
CPC .................................. *H04L 65/602* (2013.01)
USPC ........................................................ 370/254

(58) Field of Classification Search
CPC .................................................... H04W 28/18
See application file for complete search history.

(56) References Cited

U.S. PATENT DOCUMENTS

| | | | |
|---|---|---|---|
| 2004/0139088 A1* | 7/2004 | Mandato et al. | 707/100 |
| 2009/0076802 A1* | 3/2009 | Witzel et al. | 704/201 |
| 2010/0161325 A1* | 6/2010 | Hellwig et al. | 704/229 |
| 2013/0157674 A1* | 6/2013 | Jylha-Ollila et al. | 455/450 |
| 2014/0056296 A1* | 2/2014 | Madabhushi et al. | 370/352 |

* cited by examiner

*Primary Examiner* — Clemence Han (57) ABSTRACT

A first user device may receive a call instruction associated with a second user device; select a particular codec list from multiple codec lists stored by the first user device based on selection rule and based on receiving the call instruction; provide the particular codec list as part of a call negotiation process; and provide, using a particular codec from the particular codec list, a data flow towards the second user device via a session between the first user device and the second user device.

20 Claims, 9 Drawing Sheets

400 ⟶

| Codec Lists 410 ||
|---|---|
| List ID | Codecs |
| 1 | A, B, C, D |
| 2 | B, A, C, D |
| 3 | B, C, D, A |
| 4 | D, C, A, B |
| 5 | E, D, B, F |
| 6 | F, A, D, G |
| ⋮ | |
| X | |

| Selection Rules 420 |||||||
|---|---|---|---|---|---|---|
| Network Information || Network Quality ||| Codec List Selection |
| Device Type | Network Type | Bit rate | Latency | Jitter | |
| Macro cell | CDMA | < 1 Mbps | >100 ms | >50 ms | 1 |
| Macro cell | CDMA | > 1 Mbps | <100 ms | <50 ms | 2 |
| Macro cell | IP | < 5 Mbps | >50 ms | >20 ms | 1 |
| Macro cell | IP | > 5 Mbps | <50 ms | <20 ms | 2 |
| Macro cell | GSM | < 1 Mbps | >100 ms | >50 ms | 5 |
| Macro cell | GSM | > 1 Mbps | <100 ms | <50 ms | 5 |
| Femto cell | IP | < 8 Mbps | >30 ms | >20 ms | 3 |
| Femto cell | IP | > 8 Mbps | <30 ms | <10 ms | 4 |
| WLAN | IP | < 10 Mbps | >40 ms | >150 ms | 5 |
| WLAN | IP | > 10 Mbps | <40 ms | <15 ms | 6 |

| Known Codecs 430 ||
|---|---|
| User device ID | Codecs |
| ID 1 | A, B, D |
| ID 2 | D, A, C |
| ID 3 | E, F, L |
| ⋮ | |
| Y | |

Selection Rules
420

| Network Information | | Bit rate | Network Quality | | Codec List Selection |
|---|---|---|---|---|---|
| Device Type | Network Type | | Latency | Jitter | |
| Macro cell | CDMA | < 1 Mbps | >100 ms | >50 ms | 1 |
| Macro cell | CDMA | > 1 Mbps | <100 ms | <50 ms | 2 |
| Macro cell | IP | < 5 Mbps | >50 ms | >20 ms | 1 |
| Macro cell | IP | > 5 Mbps | <50 ms | <20 ms | 2 |
| Macro cell | GSM | < 1 Mbps | >100 ms | >50 ms | 5 |
| Macro cell | GSM | > 1 Mbps | <100 ms | <50 ms | 5 |
| Femto cell | IP | < 8 Mbps | >30 ms | >20 ms | 3 |
| Femto cell | IP | > 8 Mbps | <30 ms | <10 ms | 4 |
| WLAN | IP | < 10 Mbps | >40 ms | >150 ms | 5 |
| WLAN | IP | > 10 Mbps | <40 ms | <15 ms | 6 |

Codec Lists
410

| List ID | Codecs |
|---|---|
| 1 | A, B, C, D |
| 2 | B, A, C, D |
| 3 | B, C, D, A |
| 4 | D, C, A, B |
| 5 | E, D, B, F |
| 6 | F, A, D, G |
| ... | |
| X | |

Known Codecs
430

| User device ID | Codecs |
|---|---|
| ID 1 | A, B, D |
| ID 2 | D, A, C |
| ID 3 | E, F, L |
| ... | |
| Y | |

SELECTING A PARTICULAR CODEC LIST FOR CODEC NEGOTIATION

BACKGROUND

Codec negotiation is a call session establishment process in which user devices (e.g., a calling user device and a called user device) each provide a codec list in order to determine a common codec between the calling user device and called user device. The codecs may be used to process data flows (e.g., audio/video data flows) transmitted between the calling user device and called user device. For example, codecs can be used to encode a data flow and to decode an encoded data flow. When a codec in both codec lists match (e.g., when the calling user device and the called user device are compatible with a common codec), the calling user device and the called user device may use the common codec in order to process/transmit the data flows. In a situation where the codec lists do not include a common codec, transcoding may need to be performed, thereby reducing audio/video transmission quality and increasing network load.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may direct a user device to select a particular codec list and provide the particular codec list during a codec negotiation process. In some implementations, the particular codec list may be selected based on a type of network device (corresponding to a type of access network) via which a call instruction is transmitted. Additionally or alternatively, the particular codec list may be selected based on a measurement of network quality and may be selected without modification of a session initiation protocol (SIP).

In some implementations, the particular codec list may list codecs in order of priority. For example, for cellular type networks, the codec list may prioritize codecs that require a lower bit rate than other codecs in the list (e.g., to reduce network load on the cellular network). For other network types where network load may not be an issue, the codec list may prioritize codecs that provide a higher audio/video transmission quality than other codecs.

Figure 1:
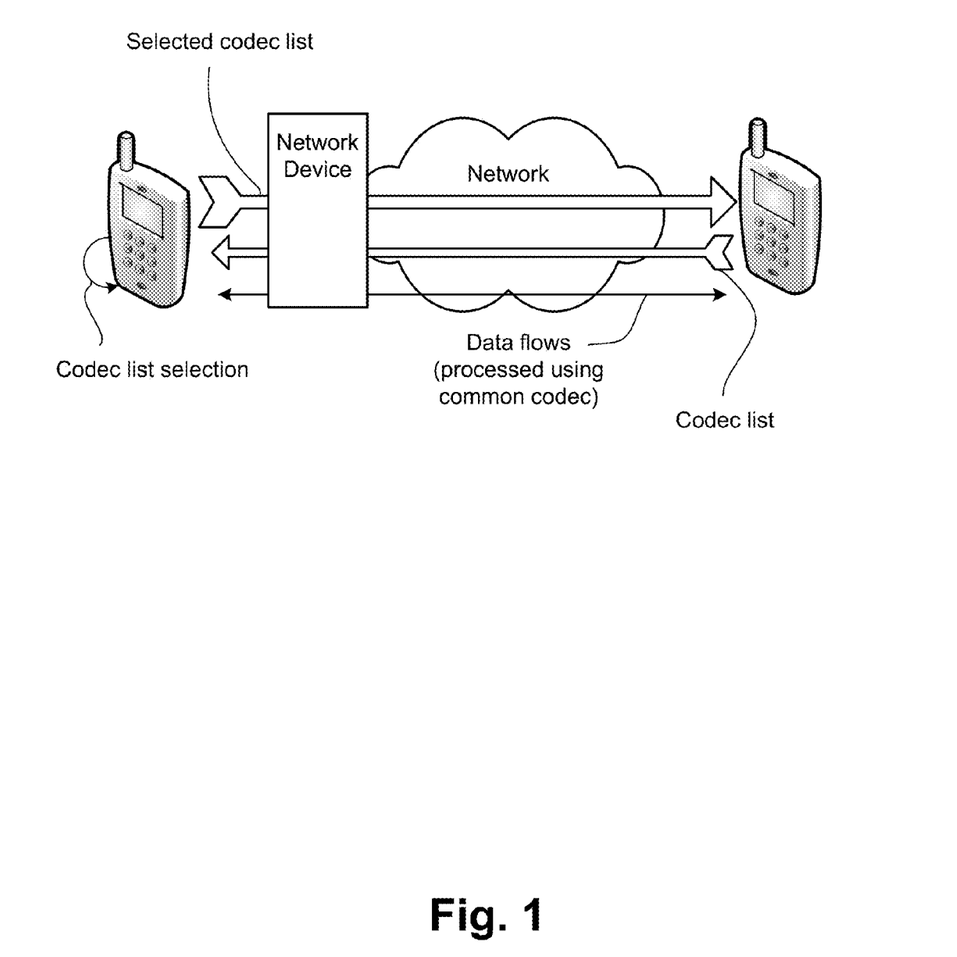
FIG. 1 illustrates an example overview of an implementation described herein.

FIG. 1 illustrates an example implementation as described herein. As shown in FIG. 1, a calling user device (e.g., UD-1) may connect to a network via a network device in order to place a call (e.g., a telephone call, a video call, or the like) to a called user device (e.g., UD-2). In some implementations, the calling user device may present a particular codec list, of multiple lists, to the called user device as part of a codec negotiation process. In some implementations, UD-1 may select the particular codec list based on a selection rule. For example, the selection rule may direct UD-1 to select the particular codec list based on a type of network device with which UD-1 connects in order to place the call. For example, when UD-1 places the call via a first network device type (e.g., a cellular network device corresponding to a cellular network), UD-1 may provide a first codec list to UD-2. When UD-1 places the call via a second network device type (e.g., a wireless local area network (WLAN) device), UD-1 may provide a second codec list to UD-2.

As used herein, the term "call" is to be broadly construed as any type of call, communication, or data flow that is processed using a codec. In some implementations, a call may be transmitted as an internet protocol (IP) based message (e.g., a voice over IP (VOIP) message) or some other type of message via a cellular network, a LAN, a circuit switch network, or some other type of network.

In some implementations, the selection rule may direct UD-1 to select the particular codec list further based on a measurement of network quality. For example, UD-1 may determine the measure of network quality based on performing a network test with the network device to determine the measure of network quality (e.g., based on a bit transfer rate, a latency value, a jitter value, etc.). As a result, UD-1 may present a codec list that is particular to the type of network connected to UD-1 and/or particular to the quality of the network connected to UD-1.

While systems and/or methods are described in terms of a calling user device (e.g., UD-1) selecting a particular codec list, in practice, the systems and/or methods are not so limited. For example, a called user device (e.g., UD-2) may select a particular codec list based on information identifying UD-1 (e.g., a telephone number of UD-1). Additionally or alternatively, UD-2 may select a particular codec list based on a type of network device 240 connected to user device UD-2 when receiving a call from UD-1.

Figure 2:
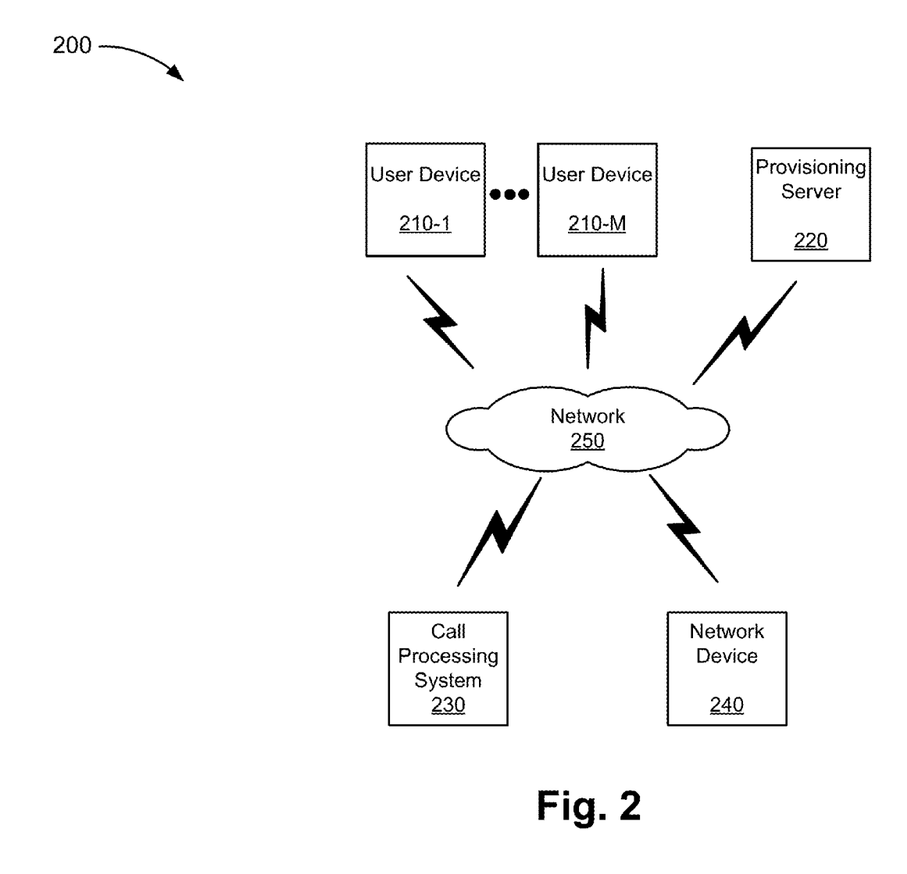
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, ..., 210-M (where M≥1), provisioning server 220, call processing system 230, network device 240, and network 250.

User device 210 may include any device capable of communicating via a network, such as network 250. For example, user device 210 may correspond to a mobile communication device (e.g., a smart phone or a personal digital assistant (PDA)), a portable computer device (e.g., a laptop or a tablet computer), a desktop computer, or another type of device. In some implementations, a calling user device 210 may place a call to a called user device 210 and may select a particular codec list to provide during a codec negotiation process when placing the call (e.g., based on one or more selection rules).

Provisioning server 220 may include one or more computing devices, such as a server device or a collection of server devices. In some implementations, provisioning server 220 may include an activation server, an over-the-air (OTA) update server, and/or some other type of server to store codec lists and/or selection rules. In some implementations, provisioning server 220 may provide the codec lists and/or the selection rules to user device 210 as part of an activation process of user device 210. Additionally, or alternatively, provisioning server 220 may provide updates to the codec lists and/or the selection rules.

Call processing system 230 may include one or more computing devices, such as a server device or a collection of server devices. In some implementations, call processing system 230 may establish a call session between user devices 210. For example, call processing system 230 may receive a call instruction from user device 210-1 to place a call to user device 210-2. In some implementations, call processing system 230 may direct user device 210-1 and user device 210-2 to each provide a codec list as part of a codec negotiation process. In some implementations, call processing system 230 may identify a common codec in the codec lists, establish a call session based on identifying the common codec, and may direct user device 210-1 and user device 210-2 to process data flows using the common codec. In some implementations, call processing system 230 may establish the call session and may transcode data flows (e.g., when a common codec is not present in the codec lists provided by user device 210-1 and user device 210-2).

Network device 240 may include one or more network devices that receive, process, and/or transmit traffic, such as audio, video, text, and/or other data, destined for and/or received from user device 210. In an example implementation, network device 240 may be an eNodeB (eNB) device and may be part of a cellular network and may be associated with a radio access network (RAN). Additionally, or alternatively, network device 240 may be a router, a hub, a gateway, a switch, a wireless access point, and/or some other type of device to receive, process, and/or transmit traffic. In some implementations, network device 240 may connect user device 210 to network 250.

Network 250 may include one or more wired and/or wireless networks. For example, network 250 may include a cellular network (e.g., a 2G network, a 3G network, a 4G network, a 5G network, a voice over long term evolution (VoLTE) network, etc.), a public land mobile network (PLMN), a local area network (LAN), a wide area network (WAN), a wireless LAN (WLAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
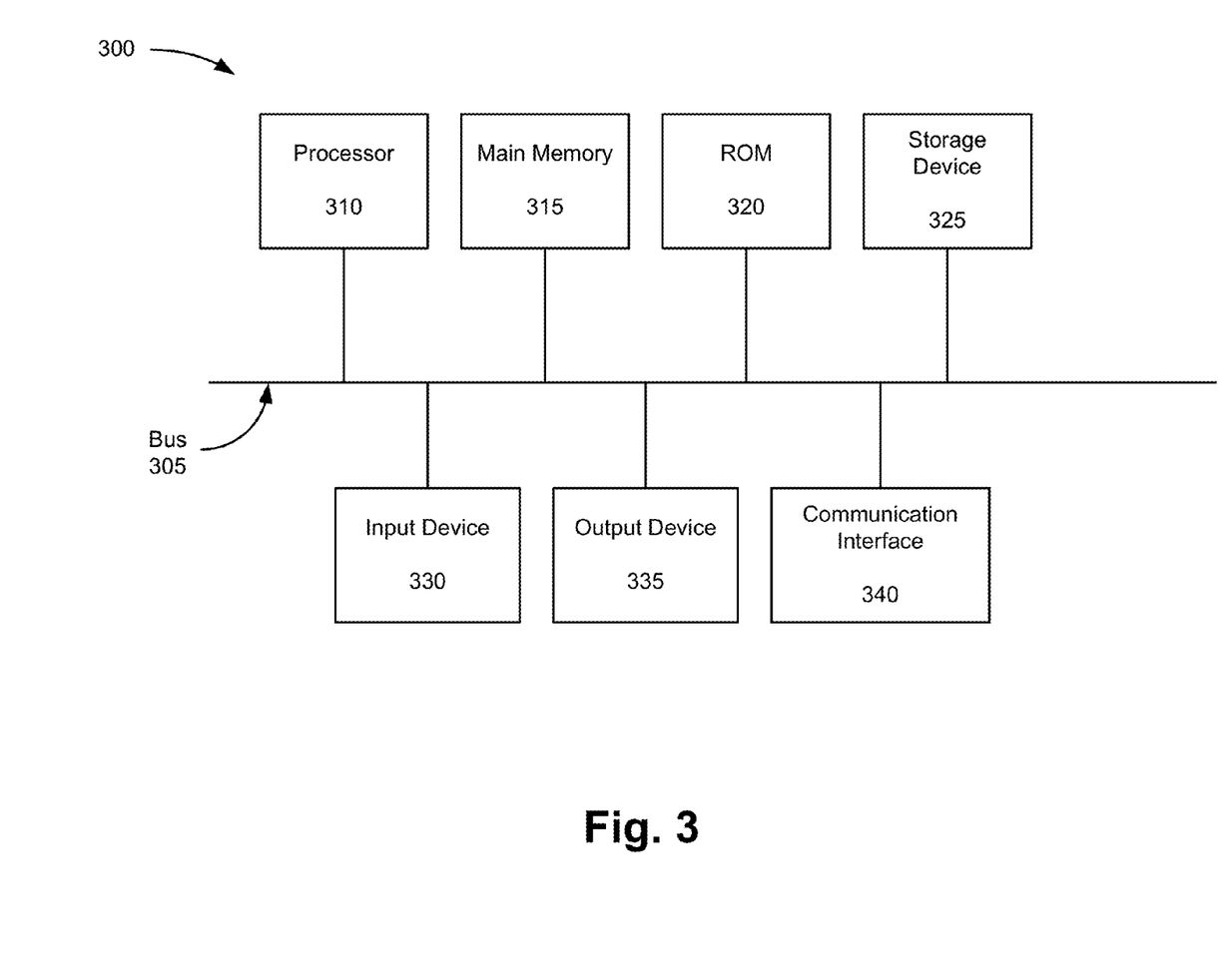
FIG. 3 illustrates example components of a device that may be used within the environment of FIG. 2.

FIG. 3 illustrates example components of a device 300 that may be used within environment 200 of FIG. 2. Device 300 may correspond to user device 210, provisioning server 220, call processing system 230, and/or network device 240. Each of user device 210, provisioning server 220, call processing system 230, and/or network device 240 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
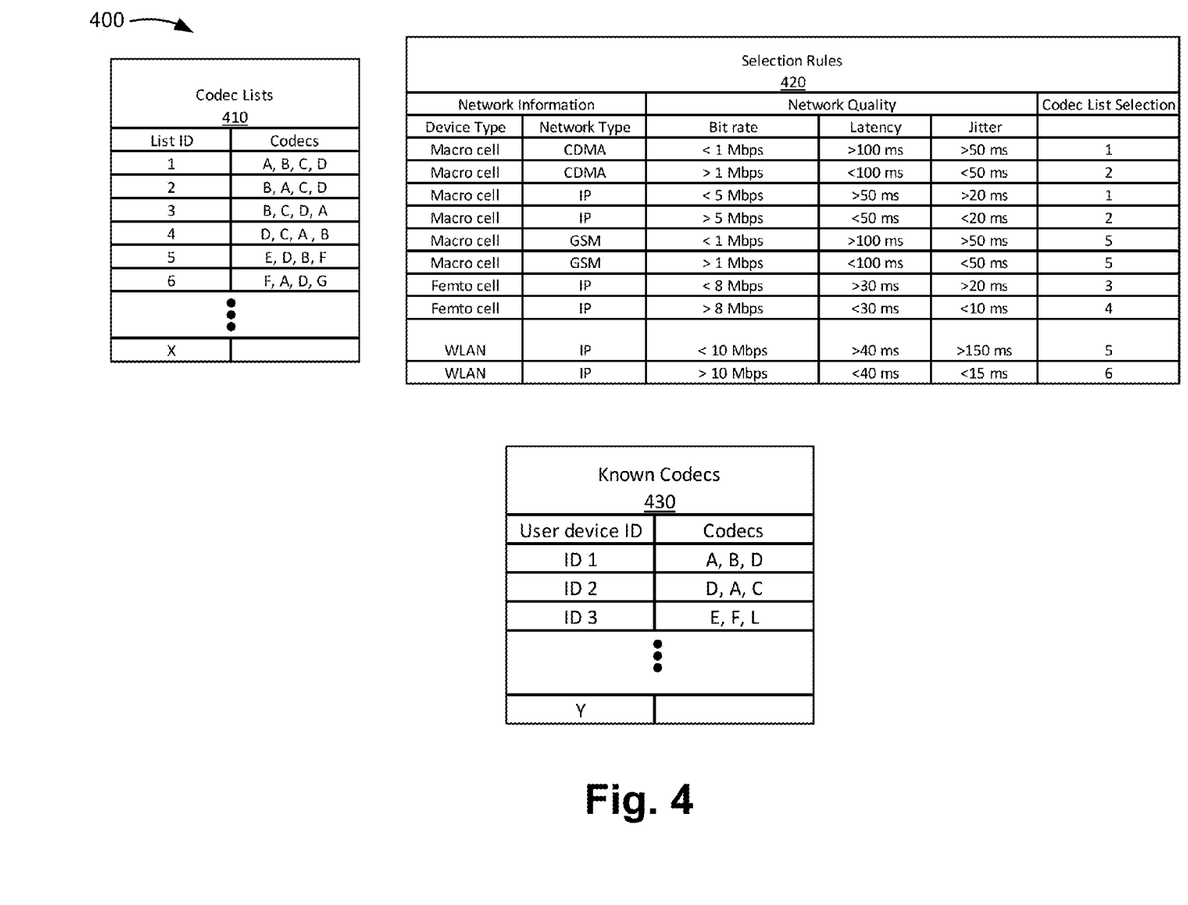
FIG. 4 illustrates an example data structure that may be stored by one or more devices in the environment of FIG. 2.

FIG. 4 illustrates an example data structure 400 that may be stored by one or more devices in environment 200, such as user device 210 and/or provisioning server 220. In some implementations, data structure 400 may be stored in a memory of user device 210 and/or provisioning server 220. In some implementations, data structure 400 may be stored in a memory separate from, but accessible by, user device 210 and/or provisioning server 220. In some implementations, data structure 400 may be stored by some other device in environment 200, such as call processing system 230 and/or network device 240.

A particular instance of data structure 400 may contain different information and/or fields than another instance of data structure 400. In some implementations, data structure 400 may store codec lists and selection rules used to select a particular codec list when user device 210 places a call.

As shown in FIG. 4, data structure 400 may include codec lists field 410, selection rules field 420, and known codecs field 430.

Codec lists field 410 may include information that identifies multiple codec lists stored by user device 210. For example, codec lists field 410 may store a list identifier (ID) for each codec list and may store a corresponding codec list for each list ID. In some implementations, the codec list may include codecs listed in order of priority or in reverse order of priority. In an example shown in FIG. 4, codec lists field 410 may store the codec list "A, B, C, D" for list ID 1. In some implementations, codec "A" may have a higher priority than codec "B" (e.g., when codec lists field 410 stores codecs in order of priority). In some implementations, codec "D" may have a higher priority than codec "C," codec "B," and codec "A" (e.g., when codec lists field 410 stores codecs in an opposite order of priority. As described above, user device 210 may select a particular codec list to provide during a codec negotiation process. In some implementations, provisioning server 220 may provide information stored by data structure 400 to user device 210 (e.g., as part of a provisioning and/or an activation process for user device 210). In some implementations, a codec list may include adaptive multi-rate (AMR) codecs, G.711 codecs, G.722 codecs, G.729 codecs, and/or some other codec.

Selection rules field 420 may include data inputs that, in some implementations, user device 210 may use to select a particular codec list during a codec negotiation process. For example, user device 210 may select a particular codec list based on data inputs, such as a type of network device 240 connected to user device 210 (e.g., a macro cell device, a femto cell device, a WLAN device, etc.), a type of network 250 associated with network device 240 (e.g., the type of network with which user device 210 communicates to place a call, such as a code division multiple access (CDMA) network, an IP network, a global system for mobile (GSM) network, etc.), and/or a measure of network quality. As described in greater detail below with respect to FIG. 5, user device 210 may select a particular codec list based on some other data input(s).

In some implementations, the measure of network quality may include a measurement of bit rate (e.g., data transfer speed), a measure of latency, a measure of jitter, and/or some other network quality related measurement associated with a network connection of user device 210. In an example shown in FIG. 4, selection rules field 420 may store information that directs user device 210 to select codec list 1 when user device 210 connects to a macro cell type network device 240 associated with a CDMA network type having a bit rate of less than 1 megabits per second (Mbps), a latency of greater than 100 milliseconds (ms), and a jitter of greater than 50 ms.

Known codecs field 430 may store information identifying one or more codecs that are known to be compatible with a particular user device 210. For example, known codecs field 430 may store information that identifies the particular user device 210 and information identifying codecs that are compatible with the particular user device 210. As described in greater detail below with respect to FIGS. 7A-7B, information may be stored by known codecs field 430 when the particular user device 210 provides a codec list as part of a codec negotiation process.

As described in greater detail below with respect to FIG. 5, user device 210 may use information stored by data structure 400 to select a particular codec list, of multiple codec lists, for a call negotiation process.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400.

In practice, other examples of information stored by data structure 400 are possible. For example, selection rules field 420 may store any number of rules and the selection rules may differ from what is shown in FIG. 4.

Figure 5:
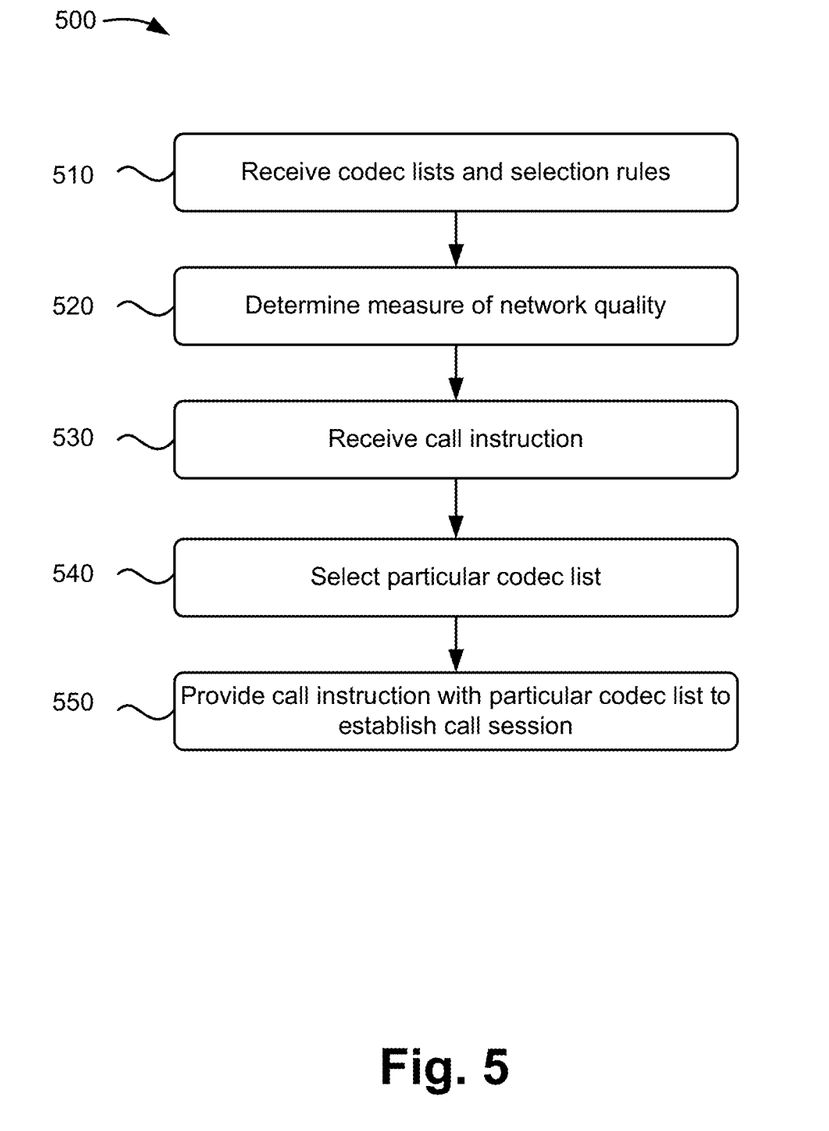
FIG. 5 illustrates a flowchart of an example process for selecting a particular codec list and establishing a call session based on the particular codec list.

FIG. 5 illustrates a flowchart of an example process 500 for selecting a particular codec list and establishing a call session based on the particular codec list. In some implementations, process 500 may be performed by one or more components of user device 210. In some implementations, some or all of blocks of process 500 may be performed by one or more components of another device in environment 200 (e.g., provisioning server 220, call processing system 230, and/or network device 240), or a group of devices including or excluding user device 210. In FIG. 5, assume that user device 210-1 is a calling user device 210 and that user device 210-2 is a called user device 210.

As shown in FIG. 5, process 500 may include receiving codec lists and selection rules (block 510). For example, user device 210-1 may receive the codec lists and the selection rules from provisioning server 220. In some implementations, provisioning server 220 may provide the codec lists and the selection rules as part of a provisioning of user device 210-1 and/or an initial activation of user device 210-1. In some implementations, user device 210-1 may receive updated codec lists and/or selection rules from provisioning server 220 when provisioning server 220 stores the updated codec lists and/or selection rules. In some implementations, user device 210-1 may connect with network device 240 and may receive the codec lists and selection rules from provisioning server 220 via network device 240 (e.g., as part of an initial activation of user device 210-1 and/or when provisioning server 220 receives updates to the codec lists and/or the selection rules). In some implementations, the codec lists and/or the selection rules may be preinstalled within user device 210-1 and/or stored by a SIP client, a message service client, a VoLTE client, and/or some other client of user device 210-1.

Process 500 may include determining a measure of network quality (block 520). For example, user device 210-1 may determine the measure of network quality by performing a network quality test to determine data used to determine the measure of network quality. In some implementations (e.g., as part of the network quality test), user device 210-1 may transmit and/or receive a test file (e.g., via network device 240). Based on transmitting and/or receiving the test file, user device 210-1 may determine network quality data, such as network transmission speed (e.g., a transmission bit rate), network latency, network jitter, network packet loss, and/or some other network quality data. In some implementations, user device 210-1 may determine the measure of network quality by performing a ping test and/or some other type of network quality test.

In some implementations, the network quality data may further include a signal strength associated with a connection between user device 210-1 and network device 240. In some implementations, particular network quality data may be weighted differently in the determination of the measure of network quality. For example, network transmission speed may be weighted differently than network latency.

In some implementations, the network quality test may be performed upon an initial connection with network device 240. Additionally, or alternatively, the network quality test may be performed at periodically (e.g., every 30 minutes, every 60 minutes, or at some other interval) in order to prevent the measure of network quality from becoming stale.

In some implementations, the measure of network quality may be determined based on an identifier of network device 240 and based on information that identifies the measure of network quality corresponding to the identifier of network device 240. In some implementations, the measure of network quality may be provided from network device 240 to user device 210-1. For example, network device 240 may perform network quality tests to determine the measure of network quality and provide the measure of network quality to user device 210-1. In some implementations, the measure of network quality may correspond to a measure of network load associated with network device 240. For example, the measure of network quality may be inversely proportional to the measure of network load.

Process 500 may also include receiving a call instruction (block 530). For example, user device 210-1 may receive the call instruction from a user of user device 210-1 (e.g., via a keypad, a voice-input device, an application, a user interface, and/or via some other input technique). In some implementations, the call instruction may include an instruction to place a telephone call, a video call, or some other type of call to user device 210-2 (e.g., a called user device 210).

Process 500 may further include selecting a particular codec list (block 540). For example, user device 210-1 may select a particular codec list based on one or more data inputs and/or based on information stored by data structure 400. In some implementations, a data input may include a type of network device 240 connected to user device 210-1, the measure of network quality (as determined in block 520), a subscription level of user device 210-1, a telephone number associated with user device 210-2 (e.g., based on information associated with the call instruction of block 530), a list of codecs known to be compatible with the called user device, and/or some other information.

In some implementations, user device 210-1 may select the particular codec list based on the type of network device 240 (corresponding to a type of network 250) and based on the measure of network quality. For example, when user device 210-1 connects to a particular type of network device 240 (e.g., a network device 240 associated with a cellular type network 250 where lower network traffic is prioritized over data flow transmission quality, such as audio bit rate/video resolution), user device 210-1 may select a codec list that prioritizes codecs that require a lower bit rate than other codecs in the list. When user device 210-1 connects to another type of network device 240 (e.g., a network device 240 associated with a LAN type network 250 where network traffic is not an issue), the selected codec list may prioritize codecs that provide a higher audio/video transmission quality (e.g., codecs that require a higher bit rate) than other codecs in the list. Additionally, or alternatively, the selected codec list may prioritize codecs whose bit rate corresponds to the measure of network quality. For example, the measure of network quality may be proportional to the bit rate associated with the codecs in the codec list.

In some implementations, user device 210-1 may select a codec list that prioritizes codecs based on a measure of codec reliability (e.g., error rates, packet loss rates, etc., associated with the codec). For example, a particular codec may have higher reliability while having a lower transmission quality than another codec. In some implementations (e.g., when user device 210-1 connects to a network device 240 where reliability is prioritized over transmission quality), user device 210-1 may select a codec list that prioritizes codecs based on the reliability of the codecs.

In some implementations, user device 210-1 may select the particular codec list based on a subscription level of user device 210-1. For example, for a particular subscription level, the selected codec list may prioritize codecs that provide a higher audio/video transmission quality than other codecs. For another subscription level, the selected codec list may prioritize codecs that require a lower bit rate than other codecs in the list.

In some implementations, user device 210-1 may select the particular codec list based on a telephone number associated with user device 210-2. For example, the particular codec list selected may be based on an area code, a country code, or some other information associated with the telephone number of user device 210-2. Additionally, or alternatively, user device 210-1 may select the particular codec list based on codecs that are known to be compatible with user device 210-2.

In some implementations, user device 210-1 may select the particular codec list based on a combination of data inputs (e.g., network device 240 type, subscription level of user device 210-1, telephone number associated with user device 210-2, codecs that are known to be compatible with user device 210-2, and/or some other data input). For example, user device 210-1 may apply weightings to each data input to select the particular codec list. Additionally, or alternatively, user device 210-1 may generate the particular codec list based on the data inputs and/or the weightings.

Process 500 may also include providing the call instruction with the particular codec list to establish a call session (block 550). For example, user device 210-1 may provide the call instruction with the particular codec list to call processing system 230 as part of a codec negotiation process. In some implementations, call processing system 230 may receive the particular codec list from user device 210-1, direct user device 210-2 to provide a codec list (e.g., based on the call instruction identifying user device 210-2), and receive the codec list from user device 210-2. In some implementations, call processing system 230 may identify a common codec (e.g., the highest priority codec that is included in both codec lists) and may establish a session between user device 210-1 and user device 210-2 based on identifying the common codec. In some implementations, user device 210-1 and user device 210-2 may process data flows using the common codec. As described above, call processing system 230 may transcode data flows when a common codec is not identified.

In some implementations, call processing system 230 may provide known codecs, associated with user device 210-1 and/or user device 210-2 to provisioning server 220. For example, call processing system 230 may store the codec lists provided by user device 210-1 and user device 210-2 to identify codecs that user device 210-1 and user device 210-2 may be compatible with (e.g., such that a codec list that prioritizes known codecs may be provided during a call negotiation process to reduce instances of transcoding).

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel. Further, one or more blocks of process 500 may be omitted in some implementations.

While FIG. 5 is described in terms of a calling user device 210 (e.g., user device 210-1) selecting a particular codec list, in practice, process 500 may also, alternatively, apply to a called user device 210 (e.g., user device 210-2) selecting a particular codec list (e.g., based on data inputs, such as a type of network device 240 connected to user device 210-2 when receiving a call instruction, a measure of network quality, subscription information associated with user device 210-2, and/or information identifying user device 210-1).

Figure 6A:
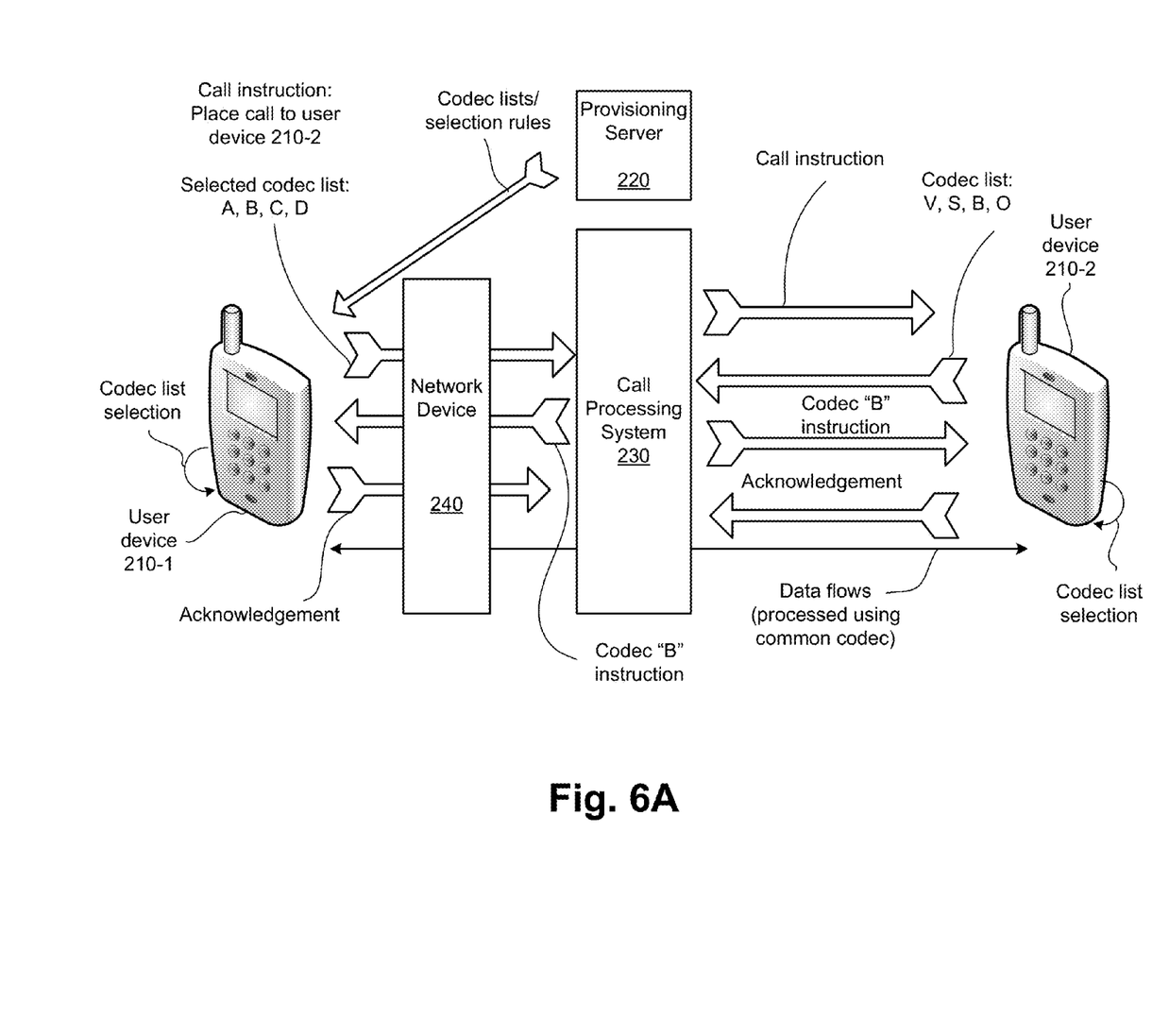
FIGS. 6A-6B illustrate an example implementation as described herein.
Figure 6B:
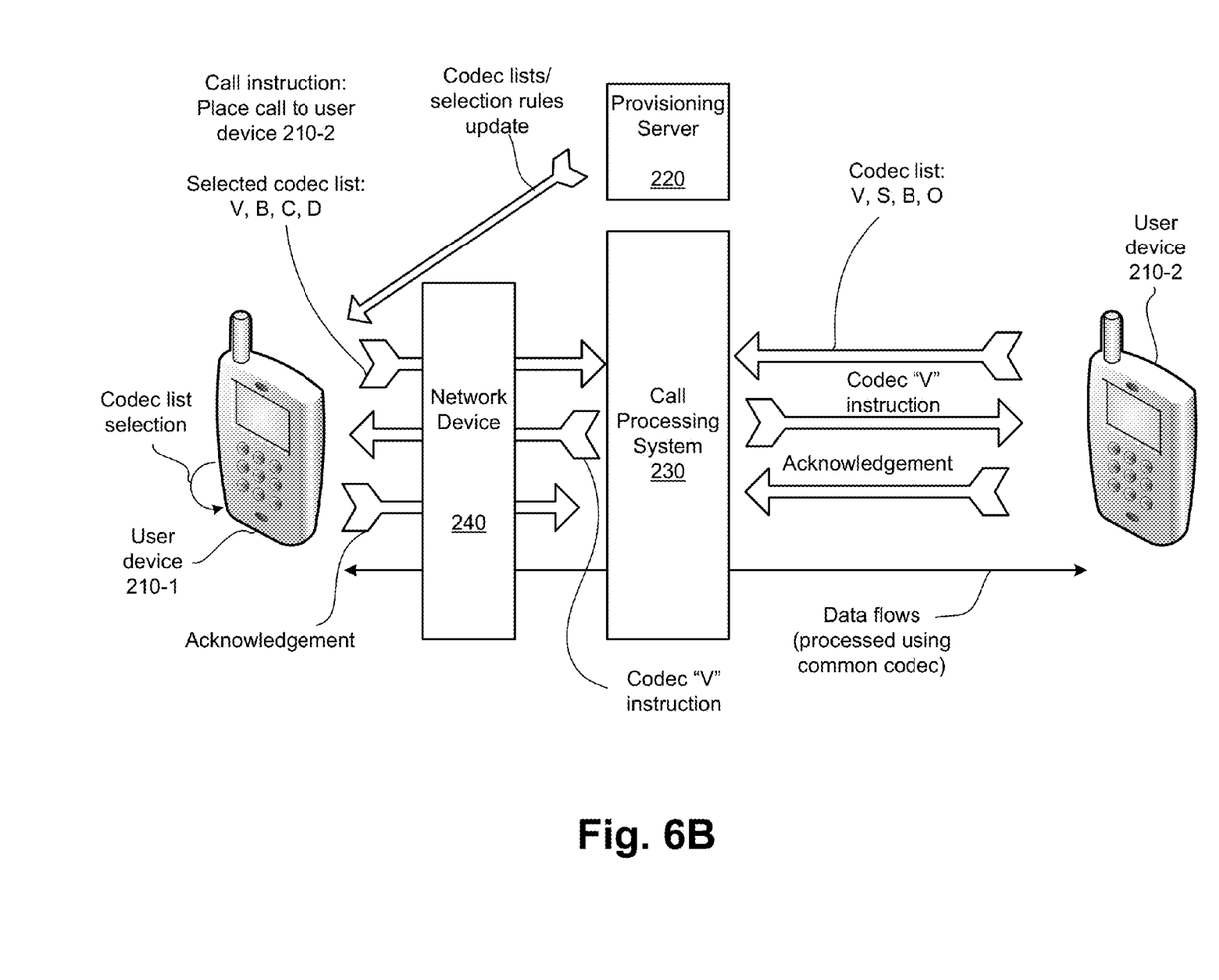

FIGS. 6A-6B illustrate an example implementation as described herein. As shown in FIG. 6A, user device 210-1 may receive multiple codec lists and selection rules from provisioning server 220. For example, provisioning server 220 may receive the multiple codec lists and the selection rules from an operator of provisioning server 220. In some implementations, the multiple codec lists and the selection rules may be based on a design decision that directs user device 210-1 to provide a particular codec list that is particular to a particular type of network device 240 and/or particular to a particular measurement of network quality. Based on the multiple codec lists, the selection rules, the type of network device 240, and/or the measurement of network quality (e.g., as determined in accordance with block 520 described above), user device 210-1 may select a particular codec list, of the multiple codec lists, and provide the particular to call processing system 230 when providing a call instruction to place a call to user device 210-2. In some implementations, user device 210-2 may also select a particular codec list of multiple codec lists stored by user device 210-2 (e.g., in accordance with process 500).

As shown in FIG. 6A, call processing system 230 may receive a codec list from user device 210-2 (e.g., based on providing an instruction to cause user device 210-2 to provide the codec list). In some implementations, call processing system 230 may determine a common codec (e.g., codec "B") based on the codec list provided by user device 210-1 and the codec list provided by user device 210-2. In some implementations, call processing system 230 may send an instruction to user device 210-1 and to user device 210-2 to process data flows using the common codec (e.g., codec "B").

In some implementations, user device 210-1 and user device 210-2 may each send an acknowledgement message to call processing system 230 to indicate that each of user device 210-1 and user device 210-2 are prepared to process data flows using the common codec (e.g., encode and decode the data flows using the common codec). In some implementations (e.g., based on receiving the acknowledgement messages), call processing system 230 may establish a communication session between user device 210-1 and user device 210-2 based on receiving the acknowledgement messages.

At a later point in time, provisioning server 220 may provide updated codec lists and/or updated selection rule sto user device 210. For example, the updated codec lists and the updated selection rules may be based on an analysis that identifies that the updated codec lists and the updated selection rules may result in a performance improvement in transmitting data flows between user devices 210-1 and user device 210-2.

Referring to FIG. 6B, user device 210-1 may receive the updated codec lists and the updated selection rules and may select a particular codec list based on the updated codec lists and updated selection rules. As further shown in FIG. 6B, user device 210-1 may provide an updated codec list when providing a call instruction to place a call to user device 210-2. Further, a common codec (e.g., the codec "V") may be used to process data flows transmitted between user device 210-1 and user device 210-2. As a result, user device 210-1 may present a codec list that is particular to the type of network device 210 connected to user device 210-1 and/or particular to the measurement of network quality. Further, the codec list may be based on the updated codec lists that correspond to a performance improvement in processing the data flows between user device 210-1 and user device 210-2.

While a particular example is shown in FIGS. 6A-6B, it will be apparent that the above description is merely an example implementation. Other examples are possible from what is described above with respect to FIGS. 6A-6B.

Figure 7A:
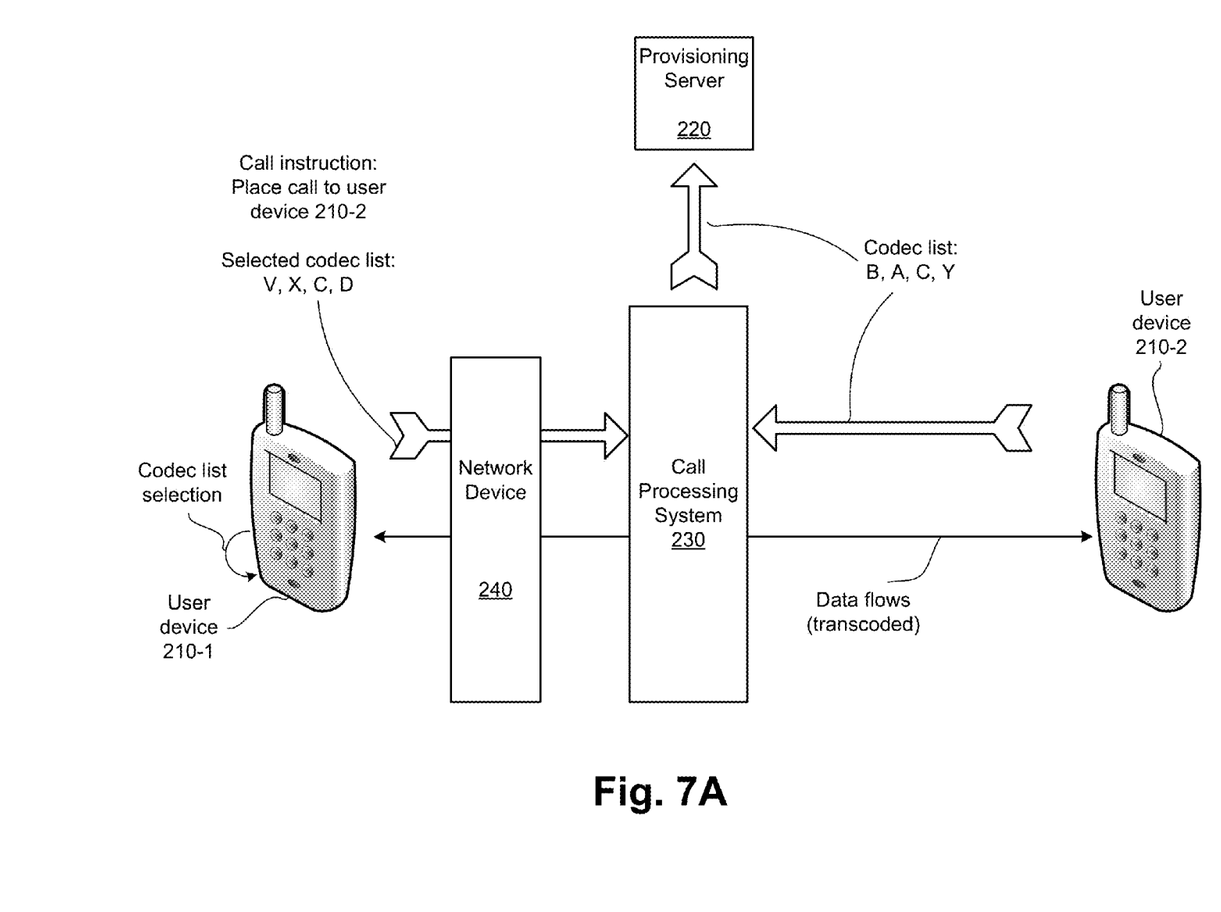
FIGS. 7A-7B illustrate an example implementation as described herein.
Figure 7B:
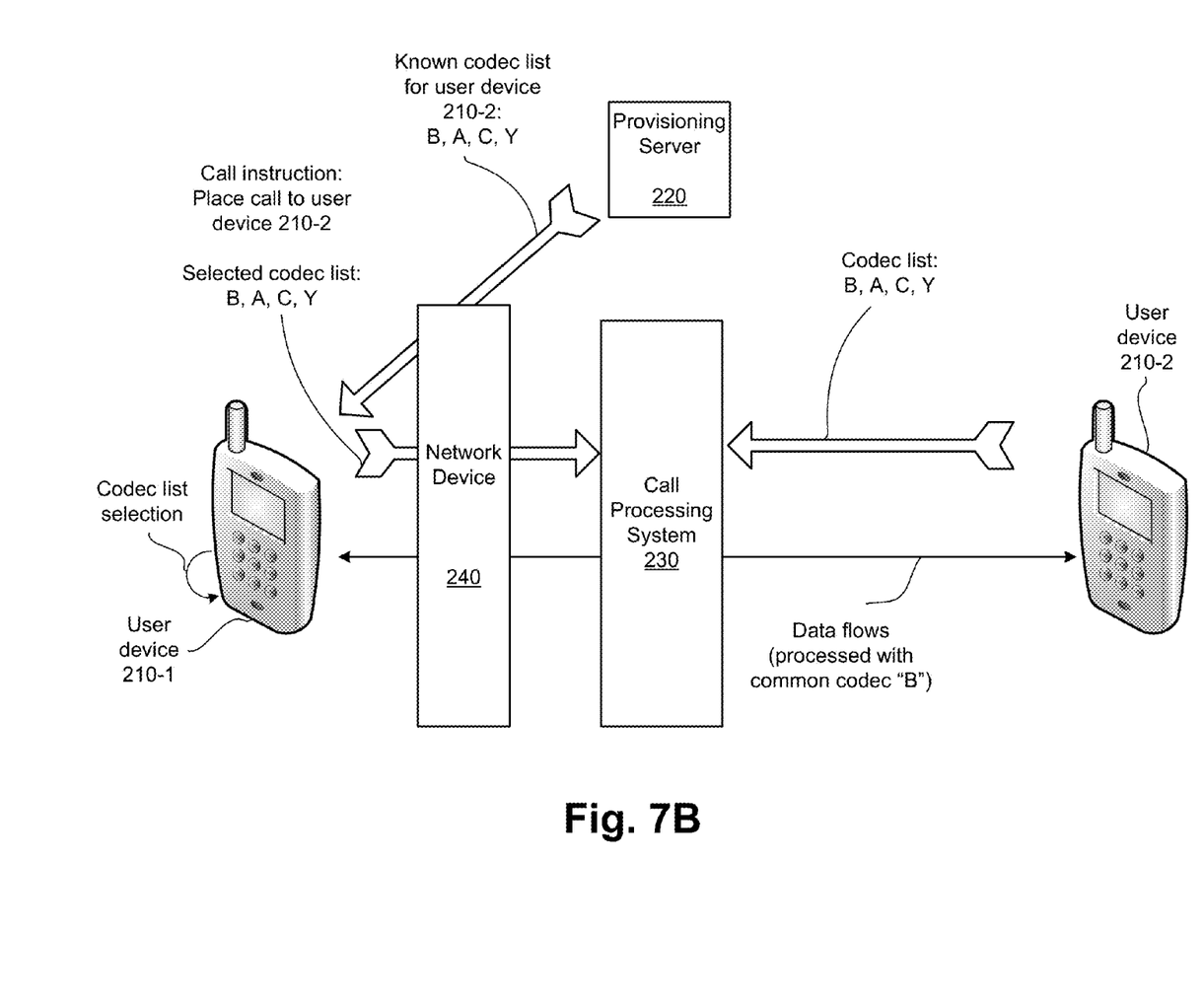

FIGS. 7A-7B illustrate an example implementation as described herein. As shown in FIG. 7A, user device 210-1 may select a particular codec list and provide the particular codec list when placing a call to user device 210-2. In FIGS. 7A-7B, assume that no codecs are common to user device 210-1 and user device 210-2. That is, call processing system 230 may transcode data flows provided by user device 210-1 and user device 210-2. In some implementations, call processing system 230 may provide the codec list, provided by user device 210-2, to provisioning server 220. In some implementations, the codec list, provided by user device 210-2, may correspond to a list of codecs known to be compatible with user device 210-2.

In FIGS. 7A-7B, assume that the codec list provided by user device 210-2 prioritizes codec "B." In some implementations, provisioning server 220 may provide user device 210-1 with a list of known codecs known to be compatible with user device 210-2 such that user device 210-1 prioritizes codec "B" when placing a subsequent call to user device 210-2. For example, referring to FIG. 7B, when user device 210-1 places a subsequent call to user device 210-2, user device 210-1 may present a codec list that prioritizes codec "B" such that call processing system 230 may identify codec "B" as a common codec. As a result, transcoding may be avoided when user device 210-1 places a call to user device 210-2.

While a particular example is shown in FIGS. 7A-7B, it will be apparent that the above description is merely an example implementation. Other examples are possible from what is described above with respect to FIGS. 7A-7B.

As described above, user device 210 may select a particular codec list, of multiple codec lists, based on a type of network device 240 used to provide a call instruction. In some implementations, user device 210 may select the particular codec list further based on a quality of a connection between user device 210 and network device 240. For example, user device 210 may determine a measurement of quality based on performing a network test.

In some implementations, user device 210 may select the particular codec list further based on information that identifies codecs known to be compatible with a called user device 210 (e.g., based on a previous call session with the called user device 210). As a result, a calling user device 210 may present a codec list that is particular to the type of network device 240 connected to the user device 210 and/or particular to a measure of quality of network 250 access. Further, the calling user device 210 may present a list of codecs that is known to be compatible with a called user device 210, thereby reducing instances of transcoding.

While systems and/or methods are described in terms of a calling user device 210 (e.g., user device 210-1) selecting a particular codec list, in practice, the systems and/or methods are not so limited. For example, a called user device 210 (e.g., user device 210-2) may select a particular codec list based on information identifying user device 210-1 (e.g., a telephone number of user device 210-1). Additionally or alternatively, user device 210-2 may select a particular codec list based on a type of network device 240 connected to user device 210-2 when receiving a call from user device 210-1.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first user device, a call instruction associated with a second user device;
   selecting, by the first user device, a particular codec list from a plurality of codec lists stored by the first user device based on a selection rule and based on receiving the call instruction;
   providing, by the first user device, the particular codec list as part of a call negotiation process; and
   providing, by the first user device and using a particular codec from the particular codec list, a data flow towards the second user device via a session between the first user device and the second user device.

2. The method of claim 1, where the selection rule relates to a type of network device connected to the first user device,
   the type of network device corresponding to a type of network via which the first user device is to communicate via the network device.

3. The method of claim 1, where the selection rule relates to a measure of network quality associated with a network via which the first user device is to communicate.

4. The method of claim 1, where the selection rule relates to information identifying known codecs associated with the second user device.

5. The method of claim 1, where the selection rule relates to an identifier of a network device connected to the first user device.

6. The method of claim 1, further comprising:
   receiving an instruction to process the data flow using the particular codec from the particular codec list; and
   processing the data flow using the particular codec,
   where providing the data flow is based on processing the data flow.

7. The method of claim 1, further comprising:
   receiving the plurality of codec lists from a server; and
   storing the plurality of codec lists,
   where selecting the particular codec list is based on storing the plurality of codec lists.

8. The method of claim 1, where the call instruction is an Internet protocol (IP) based message associated with a cellular network.

9. A system comprising:
   a first user device to:
      store a plurality of codec lists;
      receive a call instruction to place a call to a second user device;
      select a particular codec list, from the plurality of codec lists stored by the first user device, based on a selection rule and based on receiving the call instruction;
      provide the particular codec list as part of a call negotiation process; and
      provide, using a particular codec from the particular codec list, a data flow towards the second user device via a session between the first user device and the second user device.

10. The system of claim 9, where the selection rule relates to a type of network device connected to the first user device,
    the type of network device corresponding to a type of network via which the first user device is to communicate via the network device.

11. The system of claim 9, where the selection rule relates to a measure of network quality associated with a network via which the first user device is to communicate.

12. The system of claim 9, where the selection rule relates to information identifying known codecs associated with the second user device.

13. The system of claim 9, where the selection rule relates to a subscription level associated with first user device.

14. The system of claim 9, where the first user device is further to:
    receive an instruction to process the data flow using the particular codec from the particular codec list; and
    process the data flow using the particular codec,
    where when providing the data flow, the first user device is further to provide the data flow based on processing the data flow.

15. The system of claim 9, where the call instruction is an Internet protocol (IP) based message associated with a cellular network.

16. A non-transitory computer-readable medium for storing instructions, the instructions comprising:
    a plurality of instructions which, when executed by one or more processors associated with a first user device, cause the one or more processors to:
       receive a call instruction provided by a second user device;
       select a particular codec list from a plurality of codec lists stored by the first user device based on a selection rule and based on receiving the call instruction;
       provide the particular codec list as part of a call negotiation process;
       receive information identifying a particular codec from the particular codec list as a result of the call negotiation process; and
       provide, using the particular codec, a data flow towards the second user device via a session between the first user device and the second user device.

17. The non-transitory computer-readable medium of claim 16, where the selection rule relates to a type of network device connected to the first user device,
    the type of network device corresponding to a type of network via which the first user device is to communicate via the network device.

18. The non-transitory computer-readable medium of claim 16, where the selection rule relates to a measure of network quality associated with a network via which the first user device is communicate, information identifying known codecs associated with the second user device, or an identifier of a network device connected to the first user device.

19. The non-transitory computer-readable medium of claim 16, where the plurality of instructions further cause the one or more processors to:

process the data flow using the particular codec,
      where one or more instructions, of the plurality of instructions, to provide the data flow, further cause the one or more processors to provide the data flow based on processing the data flow.

20. The non-transitory computer-readable medium of claim 16, where the selection rule relates to a subscription level associated with first user device.

\* \* \* \* \*